United States Patent [19]

Byrnes

[11] Patent Number: 5,377,556
[45] Date of Patent: Jan. 3, 1995

[54] CORE ELEMENT TENSION MECHANISM HAVING LENGTH ADJUST

[75] Inventor: John L. Byrnes, Waterbury, Conn.

[73] Assignee: Teleflex Incorporated, Limerick, Pa.

[21] Appl. No.: 127,432

[22] Filed: Sep. 27, 1993

[51] Int. Cl.⁶ ............................................. F16C 1/10
[52] U.S. Cl. ................................ 74/502.6; 74/502.4; 74/500.5; 74/501.5 R; 74/502
[58] Field of Search .............. 74/500.5, 502, 502.4, 74/502.6

[56] References Cited

U.S. PATENT DOCUMENTS

| | | | |
|---|---|---|---|
| 2,415,099 | 2/1947 | Hooper | 74/502 |
| 2,644,504 | 7/1953 | Vick | 74/502 |
| 4,031,343 | 6/1977 | Sopko | 74/502.6 |
| 4,141,117 | 2/1979 | Van Gompel | 74/502 |
| 4,342,298 | 8/1982 | Plasko | 74/502.6 |
| 4,378,713 | 4/1983 | Haskell et al. | 75/501.5 |
| 4,428,180 | 1/1984 | Carlson | 56/11.3 |
| 4,671,445 | 6/1987 | Barker et al. | 74/501.5 R |
| 4,696,203 | 9/1987 | Gregory | 74/501 R |
| 4,753,124 | 6/1988 | Chevance | 74/501.5 R |
| 4,787,263 | 11/1988 | Jaksic | 74/501.5 R |
| 4,799,400 | 1/1989 | Pickell | 74/502.6 |
| 4,869,123 | 9/1989 | Stocker | 74/501.5 R |
| 4,887,929 | 12/1989 | Hale | 74/502.6 X |
| 4,917,418 | 4/1990 | Gokee | 74/502.6 X |
| 5,015,023 | 5/1991 | Hall | 74/502.6 X |
| 5,031,737 | 7/1991 | Dzioba et al. | 74/502.6 |
| 5,138,897 | 8/1992 | Beard et al. | 74/501.5 R |
| 5,261,293 | 11/1993 | Kelley | 74/502.6 |

*Primary Examiner*—Vinh T. Luong
*Attorney, Agent, or Firm*—Reising, Ethington, Barnard, Perry & Milton

[57] ABSTRACT

A motion transmitting remote control cable assembly (10) for transmitting motion in a curved path comprises a motion transmitting core element (12) having first and second segments (14,16) and a tension adjusting spring (20) disposed between these segments. The assembly also includes an angled flange (24) disposed on an end of the second segment (16) angled to thread into the spring (20) to enable adjustment to the slack length of the core element (12).

20 Claims, 2 Drawing Sheets

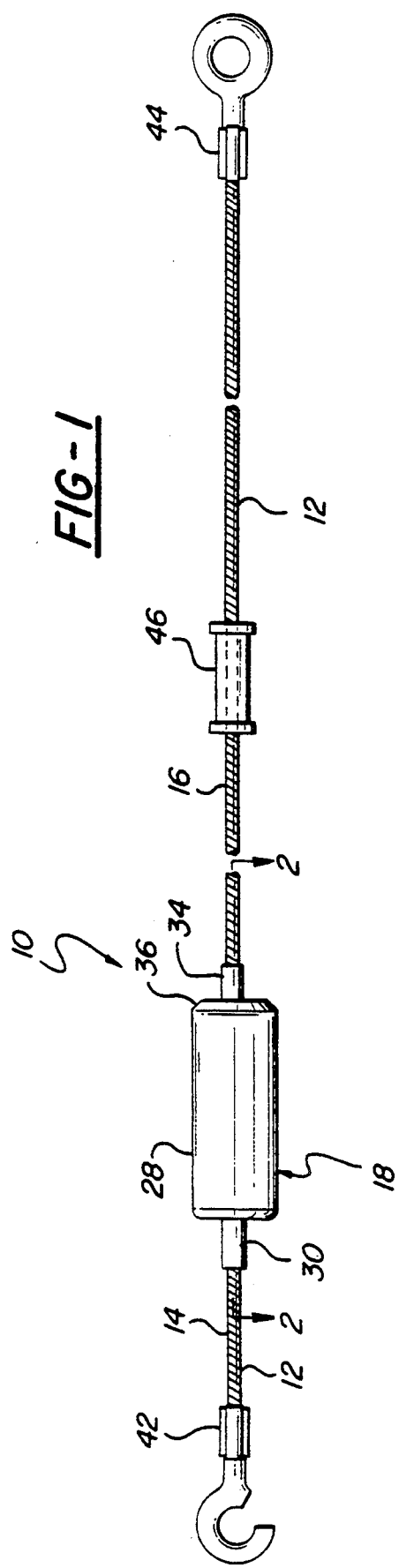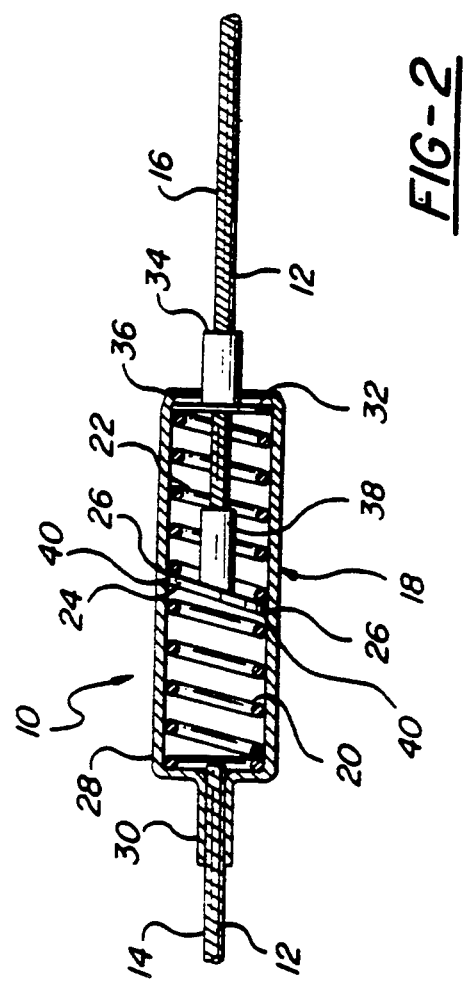

CORE ELEMENT TENSION MECHANISM HAVING LENGTH ADJUST

TECHNICAL FIELD

The subject invention relates to motion transmitting remote control cable assemblies of the type for transmitting motion in a curved path, and more particularly to assemblies for adjusting the length of motion transmitting core elements.

BACKGROUND OF THE INVENTION

It is desirable in many remote control environments to include a tension adjustment mechanism along the length of a motion transmitting core element to maintain the tension of the core element. U.S. Pat. No. 4,428,180 to Carlson teaches the concept of placing a helical spring between two segments of a core element. The spring fits inside a housing which attaches to one end of one of the segments. An end of the second segment extends through the housing and through the helical spring. An annular flange or washer disposed on this end of the second segment abuts the end of the spring and prevents the second segment from being pulled through the spring. The flange thus retains the second segment to the first segment.

It would be desirable in a number of circumstances to provide adjustment in the manner in which the first and second segments attach in order to adjust the overall slack length of the core element. U.S. Pat. No. 4,696,203 to Gregory teaches a core element having such an adjustment, but the adjustment mechanism is unnecessarily complex for most purposes.

SUMMARY OF THE INVENTION

A motion transmitting remote control cable assembly for transmitting motion in a curved path comprises a motion transmitting core element having first and second segments and a tension adjustment mechanism disposed between the first and second segments of the core element. The tension adjustment mechanism comprises a helical spring having a first end and a second end, an inner diameter and an outer diameter and a plurality of spaced apart helical coils. The spring is secured to one end of the first segment generally coaxial with the first segment. The tension adjustment mechanism also includes a flange disposed on the second segment and extending radially away from the second segment to distal extremities. The assembly is characterized by the flange extending across the inner and outer diameters with the distal extremities disposed in a plane parallel to the helical coils for varying the position of the flange along the spring upon relative rotation between the spring and the flange to adjust the overall length of the core element and for preventing the second segment from being pulled axially through the spring.

Thus, the invention provides a simple and inexpensive way to adjust the slack length of a core element having a tension adjusting spring.

FIGURES IN THE DRAWINGS

Other advantages of the present invention will be readily appreciated as the same becomes better understood by reference to the following detailed description when considered in connection with the accompanying drawings wherein:

FIG. 1 is a side view of the subject invention;

FIG. 2 is a section view of the housing showing the relationship of the spring and the flange.

DETAILED DESCRIPTION OF THE INVENTION

Figure 3:
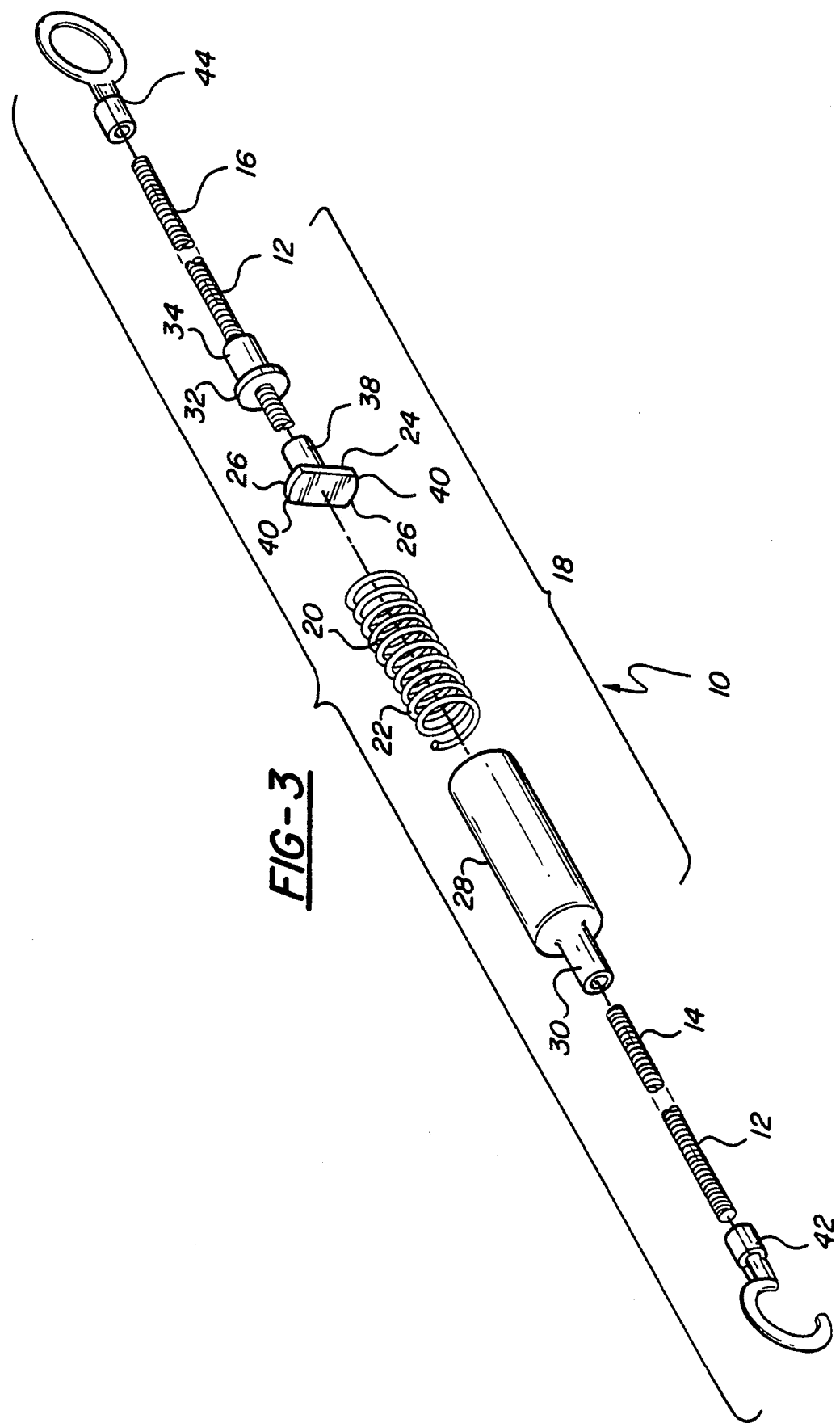
FIG. 3 is an exploded view of the subject invention.

Referring to the figures wherein like numerals indicate like or corresponding parts throughout the several views, a motion transmitting remote control cable assembly is generally shown at 10. The assembly 10 comprises a motion transmitting core element 12 having first and second segments 14,16 and a tension adjustment mechanism generally indicated at 18 disposed between the first and second segments. The tension adjustment mechanism 18 comprises a helical spring 20 having a first end and a second end, an inner diameter and an outer diameter and a plurality of spaced apart helical coils 22. The spring 20 is secured to one end of the first segment 14 generally coaxial with the first segment. The tension adjustment mechanism 18 also includes a flange 24 disposed on the second segment 16 and extending radially away from the second segment to distal extremities 26. The assembly 10 is characterized by the flange 24 extending across the inner and outer diameters with the distal extremities 26 disposed in a plane parallel to the helical coils 22 for varying the position of the flange along the spring 20 upon relative rotation between the spring and the flange 24 to adjust the overall length of the core element 12 and for preventing the second segment 16 from being pulled axially through the spring 20. The spring 20 is open at one end to allow the flange 24 to thread into the coil at the one end.

The whole point of the invention is that the flange angle matches the helical angle of the spring 20 so that the flange can "thread" into the spring 20 to provide a continuous adjustment to the slack length of the core element 12. In this way the length of the core element 12 can be adjusted in an amount slightly less than the length of the spring 20.

As has been said, the spring 20 is a helical spring having a plurality of coils 22 which each define a helical or spring angle. The spring 20 is open at one end to receive the flange 24, and closed at the opposite end.

The assembly 10 includes a housing 28 for housing the spring 20. The housing 28 has first and second ends, where the housing is attached at the first end to the first segment 14. The housing 28 includes at the first end a crimping tube 30 receiving the first segment 14, the crimping tube being crimped onto the first segment to secure the housing to the first segment. It is in this manner that the spring 20 is attached coaxially to the first segment 14. The housing 28 is open at the second end to enable the spring 20 to be inserted into the housing. The housing 28 also has a tubular inner surface having an inside diameter. This inner diameter of the housing 28 is slightly greater than the outer diameter of the spring 20.

A closing member 32 extends across and closes the second end of the housing 28 to retain the spring 20 within the housing after the spring has been inserted into the housing. The closing member 32 is positioned to abut and compress the spring 20 slightly to prevent rotational movement of the spring with respect to the housing 28. If the closing member 32 did not fix the spring 20, and the spring was allowed to rotate with respect to the housing 28, adjustment would be impossible. The closing member 32 defines an opening 34 for allowing the second segment 16 to pass through the opening and into the housing 28. The opening in the closing member 32 is a tubular portion extending away from the closing member 32 for slideably supporting the second segment 16 as the second segment passes through the closing member.

The second end of the housing 28 includes retaining means 36 for retaining the closing member 32 within the housing. Various means may be used to perform the function. Preferably, the retaining means 36 is a curl formed in the second end of the housing 28 extending radially inward to abut the closing member 32. The curl 36 abuts the closing member 32 in such a way as to maintain the closing member in contact with the end of the spring 20 so that the spring is in the desired state of compression.

The distal extremities 26 of the flange 24 extend generally to the inside diameter of the housing 28. This centers the flange 24 within the helical spring 20 and maintains it in such a position so it always abuts a coil 22 of the spring and prevents the second segment 16 from being pulled through the center of the spring. The distal extremities 26 of the flange 24 are rounded slightly to conform to the tubular inner surface of the housing 28.

The flange 24 has a substantially rectangular shape. The flange 24 includes a hollow cylindrical portion 38 coaxial with the second segment 16 for receiving and crimping over the second segment. The distal extremities 26 of the flange 24 each have a distal surface 40 generally parallel to the hollow cylindrical portion 38. These distal surfaces 40 tend to engage the inner surface of the housing 28.

The first segment 14 includes a first terminal 42 on the end of the first segment opposite the housing 28 for attaching the first segment to a support structure. Similarly, the second segment 16 includes a second terminal 44 disposed on the end of the segment opposite from the flange 24 for attaching the second segment to a support structure. These terminals can be open or closed eyelets, for example. Closed eyelets are preferred because they tend to be stronger. The support structure is typically a vehicle seat assembly 10. The core element 12 is part of the assembly 10 which disengages or engages the seat to a track so that the seat can be selectively positioned at some point along the track.

Finally, the assembly 10 includes a tubular sleeve 46 disposed along the core element 12. This sleeve 46 can be attached to the support structure (for example the under part of a seat) to divert the path of the core element 12 from a substantially straight path to a somewhat curved path. Once the sleeve 46 is moved out of the straight path, the core element 12 must still pass through it: and in this manner the core element will define a non-straight or curved path.

To adjust the length of the core element 12 one should preferably rotate the housing 28 and the spring 20 with respect to the flange 24 so that the flange threads along the coils 22 of the spring. Once the terminals 42,44 are attached to the support structure, any further rotation of the housing 28 will be impossible, and so the length of the core element 12 will remain constant but for the compression and relaxation of the spring 20.

The invention has been described in an illustrative manner, and it is to be understood that the terminology which has been used is intended to be in the nature of words of description rather than of limitation.

Obviously, many modifications and variations of the present invention are possible in light of the above teachings. It is therefore to be understood that within the scope of the appended claims the invention may be practiced otherwise than as specifically described.

We claim:

1. A motion transmitting remote control cable assembly (10) for transmitting motion in a curved path comprising:
   a motion transmitting core element (12) having first and second ends;
   a tension adjustment mechanism (18) disposed between said first and second ends of said core element (12) comprising:
   a helical spring (20) responsive to axial forces having a first end and a second end, an inner diameter and an outer diameter and a plurality of spaced apart helical coils (22), said spring being secured to said core element (12) coaxial with said core element;
   a flange (24) disposed on said core element (12) inside said spring (20), said flange extending radially away from said core element;
   beyond said inner diameter of said spring (20) and between adjacent coils (22) for moving along said spring (20) upon relative rotation between said spring and said flange.

2. An assembly (10) as set forth in claim 1 wherein said spring (20) is open at one end.

3. An assembly (10) as set forth in claim 1 including a tubular sleeve (46) disposed along a portion of said second segment (16).

4. An assembly (10) as set forth in claim 1 wherein said flange (24) extends away from said core element (12) to distal extremities (26), said distal extremities and said core element (12) defining an acute angle.

5. An assembly as set forth in claim 4 wherein said core element (12) includes first and second segments (14,16), said helical spring (20) being secured to one end of said first segment (14), said flange (24) being disposed on said second segment (16).

6. An assembly (10) as set forth in claim 5 including a housing (28) enclosing said spring (20), said housing having first and second ends, said housing being attached at said first end to said first segment (14).

7. An assembly (10) as set forth in claim 6 wherein said housing (28) has a tubular inner surface having an inside diameter, said distal extremities (26) of said flange (24) extending to said inside diameter of said housing.

8. An assembly (10) as set forth in claim 7 wherein said flange (24) has the shape of a rectangular prism.

9. An assembly (10) as set forth in claim 8 wherein said distal extremities (26) of said flange (24) are rounded to conform to said tubular inner surface of said housing (28).

10. An assembly (10) as set forth in claim 9 wherein said distal extremities (26) of said flange (24) each include a distal surface (40) parallel to said core element (12).

11. An assembly (10) as set forth in claim 10 wherein said flange (24) includes a hollow cylindrical portion (38) coaxial with said second segment (16).

12. An assembly (10) as set forth in claim 5 wherein said second segment (16) includes a second terminal (44) disposed on the end of said segment opposite from said flange (24) for attaching said second segment to a support structure.

13. An assembly (10) as set forth in claim 6 including a closing member (32) extending across said second end of said housing (28).

14. An assembly (10) as set forth in claim 13 wherein said closing member (32) abuts and compresses said spring (20) to prevent rotational movement of said spring with respect to said housing (28).

15. An assembly (10) as set forth in claim 14 wherein said closing member (32) defines an opening (34) for allowing said second segment (16) to pass through said opening and into said housing (28).

16. An assembly (10) as set forth in claim 15 wherein said second end of said housing (28) includes retaining means (36) for retaining said closing member (32) within said housing (28).

17. An assembly (10) as set forth in claim 16 wherein said retaining means (36) is a curl in said second end of said housing (28) extending radially inward to abut said closing member (32).

18. An assembly (10) as set forth in claim 15 wherein said closing member (32) includes a tubular portion extending away from said closing member supporting said second segment (16) as said second segment passes through said closing member.

19. An assembly (10) as set forth in claim 6 wherein said housing (28) includes at said first end a crimping tube (30) receiving said first segment (14), said crimping tube being crimped onto said first segment to secure said housing (28) to said first segment.

20. An assembly (10) as set forth in claim 6 wherein said first segment (14) includes a first terminal (42) on the end of said first segment opposite said housing (28) for attaching said first segment to a support structure.

* * * * *